United States Patent Office 3,177,994
Patented Apr. 13, 1965

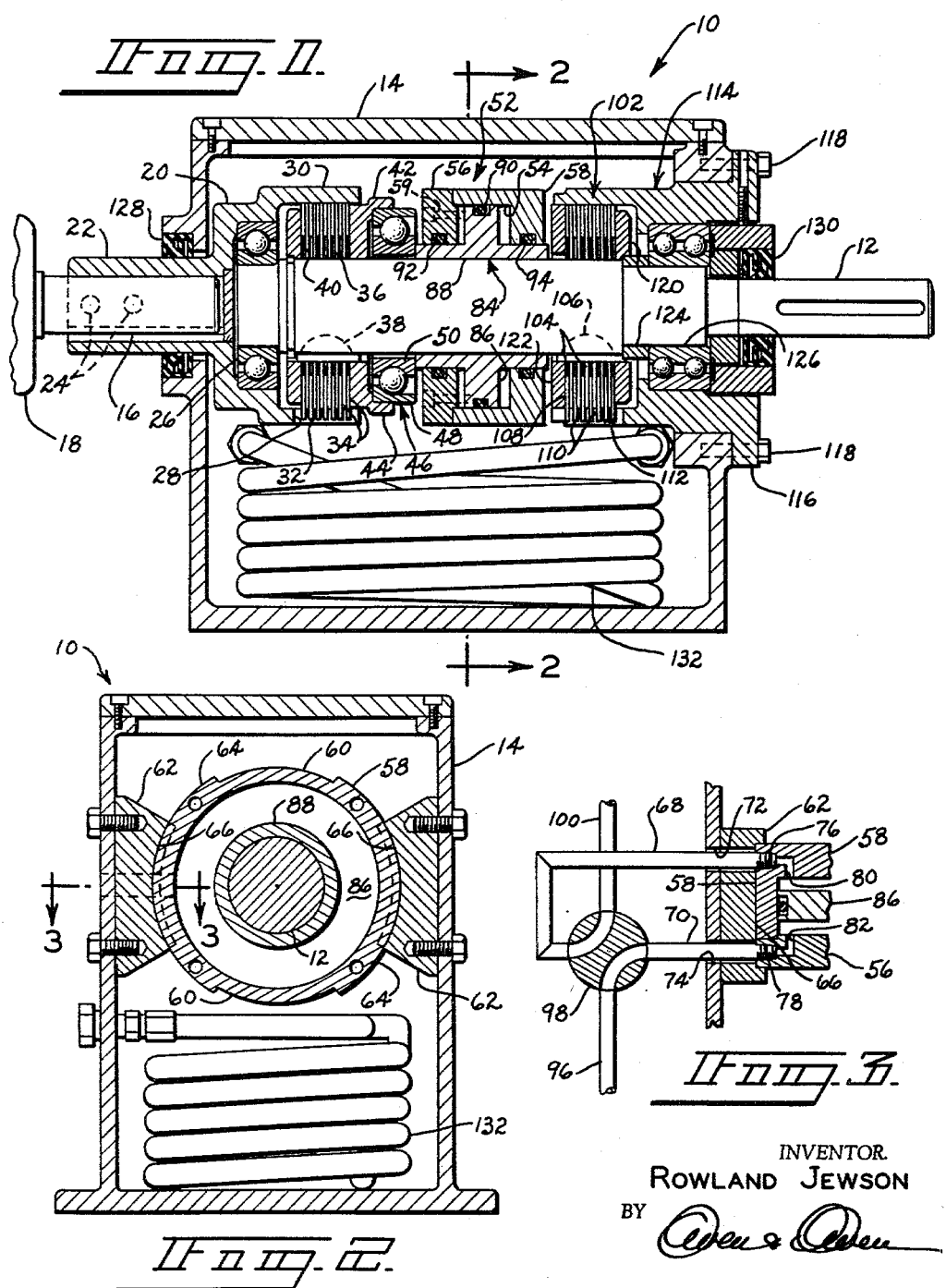

3,177,994
FLUID-ACTUATED CLUTCH AND BRAKE
Rowland Jewson, Toledo, Ohio, assignor to The Bunting Brass and Bronze Company, Toledo, Ohio, a corporation of Ohio
Filed Aug. 3, 1962, Ser. No. 214,626
5 Claims. (Cl. 192—18)

This invention relates to a device for the transmission of power between a driving shaft and a driven shaft, and more particularly to a fluid actuated control device operable at the will of the operator for frictionally connecting and disconnecting the driving and driven shafts, together with braking means operable coincidentally with the disconnection of a driving and driven shaft to apply a braking force and stop the rotation of the driven shaft. In the preferred form of the invention, a pneumatically operated piston is used to cause connection of the clutch and alternate operation of the brake mechanism.

Combination brake and clutch control devices have been used for many years. Such devices are particularly suitable for use with machine tools in which frequent stopping and starting operations are necessary. With most lathes, for example, it is undesirable to stop and start the electric motor which drives the lathe since the starting current of the common electric motor is generally about 200% of the full load current so that a surge occurs each time the motor is started. This causes unnecessary heating of the motor and unnecessary power drain. It has been found desirable, therefore, to permit the motor to run continuously and to interpose a separate mechanism which will permit the continuously operating motor to be connected or disconnected to the driven shaft which may be the lathe spindle drive.

Presently known drive control mechanisms are difficult to dismantle and repair since various fluid connections must be interrupted and various of the brake and clutch elements must be dismantled before the mechanism can be taken apart for reworking.

The primary object of the present invention is to provide a clutch and brake control device which may be readily dismantled for replacement of parts and for other repairs.

Another object of the invention is to completely eliminate all spring loaded elements which may be subject to deterioration.

Another object of the invention is to provide a clutch and brake control device which may be readily interposed in the power train of a machine tool without significant modification of the existing elements.

Other objects and advantages of the invention will become apparent from the following description of a preferred form thereof, reference being had to the accompanying drawings in which:

FIG. 1 is a longitudinal cross-sectional view of a clutch and brake assembly embodying the present invention;

FIG. 2 is a cross section on the line 2—2 of FIG. 1; and

FIG. 3 is a fragmentary, cross-sectional view taken along the line 3—3 of FIG. 2.

Referring to the drawings, and more particularly to FIG. 1, a clutch and brake assembly according to the invention is indicated generally at 10 and includes a spindle or driven shaft 12 extending from one end of the housing 14 and a drive shaft 16 connected to a driving motor 18. The drive shaft 16 is keyed to and drives an input clutch cup 20 which has an elongated collar 22 affixed to the shaft 16 by setscrews 24 to prevent relative axial movement between the motor shaft and the collar 22. The clutch cup 20 is provided with an inner ball race 26 which supports an inner end of the driven shaft 12 in alignment with the drive shaft 16. The clutch cup also has a plurality of spaced notches or cut-outs 28 around the perimeter of an annular flange portion 30, which notches receive tabs 32 of driving clutch discs 34. The drive discs 34 always rotate with the clutch cup 20 because of the cooperation between the tabs 32 and the notches 28. A series of driven clutch discs 36 are located between the drive discs 34 and are connected to the driven shaft by a key 38. The discs 34 and 36 can rotate freely with respect to one another except when forced together into driving engagement against an annular backing ring by means of a thrust retainer 42. Clutches of this nature are known in the art and the elements, per se, form no part of the present invention.

The retainer 42 has an annular bearing flange 44 which supports a thrust bearing 46 including an outer race 48 held by a press fit in engagement with the flange 44 and including an inner race 50 which is spaced from the driven shaft 12. When the thrust bearing is moved toward the left by a force exerted on the inner race 50 the retainer 42 is moved and exerts a squeezing or clutching force on the discs 34 and 36, moving them together against the backing ring 40. The discs 34 and 36 then rotate together and the drive and driven shafts are connected.

The present invention provides a simple and highly effective fluid actuated control device for the clutch and for a brake which will be subsequently described. The control device is designated generally 52 and includes a cylinder 54 formed by an end plate 56 and a cylinder housing 58. As shown in FIG. 1, these components are held together by a plurality of screws 59 and have cooperating circumferential recesses or notches 60 which constitute, in effect, an interrupted thread and enable the components to be easily assembled with arcuate supports 62 which are affixed to the side walls of the housing 14.

The manner of assembly of the components which the present invention provides is extremely fast, accurate and positive. To cooperate with the arcuate supports 62, the outer side walls of the cylinder assembly are provided with interrupted retaining means comprising spaced arcuate projections 64. These projections are interrupted to form the notches 60, and the arcuate supports 62 subtend an angle slightly less than the angle of the notches or grooves 60 so that in one rotated position the projections will clear cooperating grooves 66 in the supporting elements 62 while in another rotated position the projections will be brought into engagement and cooperate to provide an accurately fixed longitudinal location for the entire clutch and brake assembly. Once the longitudinal location of the assembly is fixed relative to the housing 14, the circumferential location of the parts can be established in any suitable manner, by fixing the fluid cylinder against rotational movement, preferably by the locating means so that a duplication of parts is not required.

In the form of the invention shown in the drawings, the fluid cylinder is held against rotation relative to the housing 14 by fluid supply lines 68 and 70 (FIG. 3). It is, of course, possible to substitute simple locating screws for the assembly, but so long as the fluid supply lines must be connected in any event, these lines serve the dual purpose of supplying fluid to the two sides of the cylinder 54 and locating the cylinder and assembly in the circumferential position relative to the housing 14. The fluid supply lines 68 and 70 extend through passages 72 and 74 in the housing 14 and through one of the supporting members 62 after which they are threadedly engaged in tapped passages 76 and 78 in the components 58 and 56 respectively. Suitable passages are drilled in the components which make up the cylinder assembly so that the supply lines communicate with the right and left ends of the cylinder 54, and the passages by which fluid is admitted to and exhausted from the opposite sides of the cylinder are designated 80 and 82 in the drawings.

Within the cylinder 54 is an annular piston member 84 which is T-shaped in lateral cross section and includes an annular piston portion 86 and an annular flange 88 extending longitudinally of the driven shaft 12, with the flange forming, in effect, one wall of the cylinder in which it cooperates. The piston 86 is maintained in fluid-tight relationship with respect to the cylinder 54 by a peripheral sealing ring 90 while the longitudinal flange 88 is maintained in fluid-tight relationship with the adjacent portions of the cylinder assembly 56 and 58 by sealing rings 92 and 94. The three sealing rings prevent the escape of fluid from either side of the cylinder to the other or along the annular flange.

Power fluid such as air is supplied to the cylinder 54 and the lines 68 and 70 from a supply line 96 which may be controlled by any suitable valve. A manually operated four-way valve 98 is indicated diagrammatically, and when the valve 98 is turned to supply air to the line 68, the line 70 is connected to a vent 100. In this manner, when fluid is supplied to the right end of the cylinder 54 it pushes the piston 86 and the flange 88 toward the left while the air from the left end of the cylinder is exhausted through the vent 100. As the piston 84 moves in this direction, the flange 88 pushes against the inner race 50 of the bearing 46, thereby moving the retainer 42 and forcing the clutch discs 44 and 46 together to establish a driving relationship between the drive shaft 16, the clutch cup 20 and the driven shaft 12.

On the opposite side of the fluid operating elements, a brake is provided which may take any suitable form but which, for purposes of economy, is made up of elements very similar to the clutch discs previously described. The brake assembly is generally indicated at 102 and includes a plurality of annular brake discs 104 which rotate with the spindle 12 through a key 106, and a plurality of interleaved stationary brake discs 108 which have tabs 110 extending into peripherally spaced notches 112 in a stationary brake member 114. The brake member 114 includes a cover flange 116 which is bolted on an end of the housing 14 by a plurality of machine screws 118. The brake discs 104 and 108 can rotate freely relative to one another until they are forced into braking engagement by a pressure plate 122 which forces the discs together and against a backing plate 120. This form of brake is also known in the art and no claims are made thereto apart from the combination. The backing plate 120 is held in position by a spacer 124 which abuts a supporting bearing 126 mounted in the stationary brake member 114 and the pressure plate 122 is free to move longitudinally over the shaft 12.

Movement of the pressure plate 122 and actuation of the brake is caused by the entrance of air through lines 70 to the left end of cylinder 54 which forces the piston 86 toward the right and causes the longitudinally extending flange 88 to contact the pressure plate 122, moving it to the right and applying a braking force to the discs 104 and 108. The braking force will bring the spindle 12 quickly to a stop. At the time the brake is applied, the driven shaft 12 has already been disconnected from the drive shaft 16 because the engagement between piston flange 88 and the bearing 46 has been broken by movement of the piston flange so that there is no longer any pressure applied between the clutch discs 34 and 36. It will thus be seen that the spindle 12 can be started and stopped rapidly because of the lower inertia forces of the components. By utilizing air on either side of the piston 86, the present invention dispenses with the usual springs which are necessary with either the clutch, the brake, or both. It is preferred that the housing 14 be partially filled with oil during operation so that the housing is sealed at each end, around the driving and driven shafts by oil seals 128 and 130 respectively. If the housing is oil filled, a cooling water coil 132 may be located in the lower portion of the housing to maintain the oil temperature at a desirable level and to dissipate heat generated by the actuation of the clutch and braking discs. The heat from the discs is transferred directly to the oil which is thrown over the rotating parts, and to this end the oil in the housing is maintained at such a level that the periphery of the collar 30 and the flange 44 are immersed. Rotation of the parts, then, will throw oil over the entire assembly.

It will be seen that the assembly so far described is capable of rapid disassembly and easy access for repairs or replacement of the clutch discs 34, 36, the braking discs 104, 108, or renewal of the seals in the fluid system. For this purpose, the screws 118 are removed which will free the outer flange 116 from the housing 14. The cover of the housing 14 may be removed if necessary. The supply lines 68 and 70 are then removed from the tapped holes 76 and 78 and are retracted. The entire internal assembly may then be rotated 90° to disengage the projections 64 from the grooves 66 in the arcuate supporting members which remain attached to the housing. The assembly can then be withdrawn from the housing through the opening at the right end. If it is unnecessary to withdraw the clutch cup 20, this element may remain attached to the driving shaft 16. However, if the bearing 26 may require renewal, it will be desirable to disengage the setscrews 24 from the motor drive shaft so that all of the elements, including the clutch cup, can be withdrawn. Once the assembly is removed from the housing 14, every element of it is available for repair or replacement.

Various modifications and changes of the above described embodiment of the invention will be apparent to those skilled in the art, and it is to be expressly understood that such modifications and changes may be made without departing from the scope of the invention as defined in the appended claims.

I claim:

1. In a drive and brake mechanism of the character described, the combination of
   (a) a main housing,
      (1) a driven shaft,
   (b) a stationary bearing member,
      (1) removably mounted in an end opening in one wall of the housing and rotatably supporting a portion of said driven shaft extending therethrough,
   (c) a driving shaft extending into the opposite end of said housing,
   (d) a clutch in said main housing operable to cause driving engagement between said driving and driven shafts,
   (e) a brake for said driven shaft disposed in said main housing and including
      (1) portions cooperating with said stationary bearing member and
      (2) portions keyed to said driven shaft,
   (f) an annular two-faced piston surrounding the driven shaft in said housing,
      (1) operating in one axial position to cause engagement of said clutch,
      (2) and in another axial position to cause engagement of said brake,
   (g) an annular housing within said main housing forming a cylinder for said annular piston,
      (1) said annular housing having interrupted retaining means on the periphery thereof and forming arcuate notches therebetween, and
   (h) spaced supporting members affixed to said main housing and engaging said retaining means and supporting said annular housing in a fixed axial position relative to said main housing,
      (1) said supporting members having arcuate interior surfaces extending circumferentially less than said notches whereby said interrupted retaining means and said supporting members can be engaged and disengaged by rotational movement of said annular housing.

2. The combination of elements defined in claim 1 and means to supply operating fluid to each face of said annular piston to move said piston axially back and forth in said cylinder, (a) said last means acting when connected to prevent rotational displacement of said annular housing.

3. The combination of elements defined in claim 1 in which said main housing contains cooling oil, and a cooling coil in said housing immersed in said oil.

4. A drive and brake mechanism of the character described comprising a housing having opposite end walls, one of which has a small diameter opening and the other of which has a large diameter opening substantially coaxial with said small diameter opening, a driving member in said housing having a drive shaft extending through said small diameter opening of said housing, said driving member being capable of passing through said large diameter opening of said housing and incapable of passing through said small diameter opening of said housing, a driven shaft projecting into said housing through said large diameter opening and having its inner end rotatably supported by said driving member, an annular, two-faced piston member positioned around said driven shaft in said housing and axially movable with respect to said driven shaft, a stationary cylinder positioned around said piston to form opposing sealed chambers therewith on opposite sides of said piston, said cylinder being capable of passing through said large diameter opening of said housing, means for supplying power fluid to the sealed chambers on either side of said piston, a stationary brake member projecting through said large diameter opening into said housing and secured to said housing, said stationary member being removable through said large diameter opening, said stationary member also rotatably supporting a portion of said driven shaft, disc means associated with said driving member and said driven shaft for engaging said driving member and said driven shaft when power fluid is supplied to said cylinder to force said piston toward said driving member, and additional disc means associated with said driven shaft and said stationary member for engaging said driven shaft and said stationary member to stop said driven shaft when power fluid is supplied to said cylinder to force said piston toward said stationary member, both of said disc means being capable of being removed through said large diameter opening of said housing.

5. A mechanism according to claim 4 wherein said cylinder has engageable means on the outer surface and further characterized by means affixed to said housing and engageable with the engageable means of said outer surface of said cylinder to enable rotatable movement of said cylinder and to prevent movement of said cylinder axially of said driven shaft when in one circumferential position and to enable said cylinder to be moved toward said large diameter opening when in another circumferential position.

References Cited by the Examiner
UNITED STATES PATENTS

| | | |
|---|---|---|
| 2,159,326 | 5/39 | Harwood et al. |
| 2,386,220 | 10/45 | Lawler et al. |
| 2,701,042 | 2/58 | Kurzweil _____ 192—87 |
| 2,909,255 | 10/59 | Chung. |
| 2,930,460 | 3/60 | Isaacson. |
| 2,966,245 | 12/60 | Judge. |

DAVID J. WILLIAMOWSKY, *Primary Examiner.*